United States Patent [19]
Murphy

[11] Patent Number: 4,926,281
[45] Date of Patent: May 15, 1990

[54] FAIL-SAFE AND FAULT-TOLERANT ALTERNATING CURRENT OUTPUT CIRCUIT

[75] Inventor: Kenneth J. Murphy, West Hills, Calif.

[73] Assignee: Triplex, Torrance, Calif.

[21] Appl. No.: 316,172

[22] Filed: Feb. 27, 1989

[51] Int. Cl.$^5$ .............................................. H02H 3/20
[52] U.S. Cl. ......................................... 361/55; 361/56; 361/91; 361/104; 340/644; 324/415
[58] Field of Search ..................... 361/54–56, 361/91, 104; 340/638, 644; 324/415, 418, 424

[56] References Cited

U.S. PATENT DOCUMENTS

| | | | |
|---|---|---|---|
| 3,475,653 | 10/1969 | Odenberg et al. | 361/104 |
| 3,600,634 | 8/1971 | Muench, Jr. | 361/55 |
| 3,968,407 | 7/1976 | Wilson | 361/56 |
| 4,351,014 | 9/1982 | Schofield, Jr. | 361/54 X |
| 4,626,952 | 12/1986 | Morikawa | 361/55 |

Primary Examiner—Todd E. Deboer
Attorney, Agent, or Firm—Noel F. Heal

[57] ABSTRACT

A protected digital output circuit coupled to a programmable controller, for controlling a load supplied through alternating-current (ac) power lines, including a fuse and a single controlled output switch connected in series with the load, and a pair of series-connected crowbar switches connected together across the ac power lines. The crowbar switches can be commanded closed together in the event that the output switch is commanded open but fails to open, thereby shorting the ac power lines and disconnecting the load by blowing the fuse. In routine diagnostic testing, the crowbar switches can be commanded closed separately to check their operation without blowing the fuse. A current detection circuit is used to check for current in the closed crowbar switch. A current sensor is also used to detect current through the output switch, when commanded closed for switching the load on, or for diagnostic turn-on testing when the load is disconnected.

17 Claims, 4 Drawing Sheets

4,926,281

FAIL-SAFE AND FAULT-TOLERANT ALTERNATING CURRENT OUTPUT CIRCUIT

BACKGROUND OF THE INVENTION

This invention relates generally to fault-tolerant circuits and, more particularly, to output circuits associated with fault-tolerant computers and industrial controllers. The concept of using multiple computational devices to maintain the integrity of a computer-controlled process has been known for some years. The computational devices perform each function separately and the results are compared to determine the "correct" one. A commonly employed configuration has three computational devices and the results are compared in a voting circuit, such that the best two of the three results is taken to be correct. When one of the three computational devices generates erroneous results, it is usually replaced promptly, to avoid the possibility of having two malfunctioning computational devices in operation at the same time. This voting concept may be applied to practically all operations performed by the computational devices, including accessing data storage locations and performing arithmetic or logical computations.

A different, but related problem is the design of output circuits to have a similar type of multiple redundancy. There are two basic types of output from computational devices used as industrial controllers. One type of output consists of "on" and "off" signals and is usually referred to as digital or binary. The second type of output is in the form of an analog signal, which might be used to control, for example, the position of a valve. The valve, in turn, can control a fluid flow rate, a pressure level, or some other physical parameter. Digital output signals are used in control processes to turn direct-current (dc) motors on and off, to open and close solenoid-actuated valves, and to perform various other functions.

In the design of fault-tolerant controllers, there is a distinction between digital outputs used to control direct-current circuits, and digital outputs used to control alternating-current (ac) circuits. The design of output circuits for ac control presents a number of problems not present in the control of dc circuits.

The primary design constraint for a fail-safe operation of a digital output circuit is that it should not fail to an ON state when the desired switching function is OFF. This may be achieved by connecting two redundant switches in series in an electrical circuit, and controlling the two switches with independently generated redundant control signals. If one of the switches fails to respond to an OFF signal, the circuit will still be opened by the other switch. Such a circuit is tested by opening one switch while the other is closed, and checking for an open circuit that should have resulted from the open switch. Then the other switch is opened while the first is closed, again checking for an open circuit. This kind of testing procedure is more difficult with ac switches because, typically, the solid-state devices used cannot be turned off at random. Also, the phase relationship between load voltage and load current varies with the type of load being driven, causing difficulty with test timing and measurement of the switch state.

An alternative approach to obtaining fail-safe operation of ac output circuits is to use only a single output switch, but in conjunction with a "crowbar" switch and a fuse in the ac circuit. The fuse and the single output switch are connected in series with a load being controlled. The crowbar switch is connected across the ac power lines, essentially in parallel with the load. When the output switch fails to open on command, the crowbar switch is closed, shorting out the power line and blowing the fuse to effect a disconnection of the load. Circuits of this general type have the advantage of using only one power-dissipating switch, and have been in use for some time, as exemplified by the protected ac output module for the General Electric Company Series Six programmable controllers.

One difficulty with ac output circuits employing a crowbar switch arrangement is that there is no nondestructive way to test the turn-on operation of the crowbar switch. Any turn-on test of the switch will blow the fuse and necessitate operator intervention. Ideally, there should be some way of testing the crowbar switch without blowing the fuse. The present invention achieves this goal, and provides other advantages in the operation of a fail-safe and fault-tolerant ac output circuit, as will be apparent from the following summary.

SUMMARY OF THE INVENTION

The present invention resides in an ac output circuit for digital controller output signals, in which a single output switch is employed to control the output circuit in response to a voted control signal, and a crowbar switch is employed to disconnect the load in the event of failure of the output switch in an ON condition. At least two major features distinguish the circuit from other protected output circuits using crowbar switches. First, the circuit of the invention provides for continual and automatic testing of the crowbar switch, and second, the control signals that operate the crowbar switch are generated independently of the control signals used to operate the output switch.

Briefly, and in general terms, the circuit of the invention includes a fuse connected in one of the ac power lines, an output switch connected in series with the fuse, two crowbar switches connected in series across the ac power lines, means for closing the crowbar switches together and blowing the fuse to disconnect the load in the event that the output switch fails to open on command, and means for closing the crowbar switches independently to test their operation without blowing the fuse. For testing of the crowbar switches, the circuit also includes a pair of current-limiting resistors connected in series between the two ac power lines, and current detection means connected to a junction point between the two crowbar switches and to a junction point between the two resistors. Closure of either of the crowbar switches causes current flow through the current detection means and one of the resistors, but the current is not great enough to blow the fuse.

The circuit further includes an output current sensor coupled in series with the output switch, to detect current flow through the output switch, a dummy load connected in parallel with the load, and a dummy load switch in series with the dummy load. The dummy load causes a detectable current flow when the output switch is switched on momentarily, regardless of the condition of the real load. In the circuit disclosed, the dummy load switch is responsive only to a transition from OFF to ON state of the output switch, and includes a positive temperature coefficient thermistor, which operates to limit current in the dummy load in the event that the dummy load switch fails in the ON state.

More specifically, the circuit of the invention includes means for independently generating multiple control signals for operating the output switch, and means for ANDing the multiple control signals to minimize the number of erroneous switch-on signals applied to the output switch. Further, the means for closing the crowbar switches separately and together include means for independently generating multiple control signals for operating each crowbar switch, and means for logically ORing the multiple control signals for each crowbar switch, to close the crowbar switches even if only one of the multiple control signals commands the closure.

In the illustrative embodiment of the invention each of the switches, including the output switch, the crowbar switches and the dummy load switch, includes a solid-state switch device.

In a further disclosed form of the invention, a single load is controlled by two identical guarded or fail-safe output modules, each with its own output switch, crowbar switches, dummy load, current detectors and diagnostic testing. However, as will be explained, the load current may be shared between the output switches on the two modules and either module may provide the full load current in the event that the other module fails in the OFF state. Each of the two modules operates independently to control the load through its output switch and to disconnect the load by blowing a fuse if necessary. The two modules together provide a higher degree of fault tolerance than a single failsafe module by not only ensuring correct OFF state operation of the load, but also ensuring correct ON state operation of the load. Additionally, a failed module may be "hot-replaced," without removing power from the system, to ensure the continued correct ON/OFF state of the load.

It will be appreciated from the foregoing that the present invention represents a significant advance in the field of digital output circuits for the control of ac loads. In particular, the invention provides a fail-safe output circuit that will automatically disconnect the load by closing a pair of crowbar switches to blow a power fuse upon detection that the output switch has failed to open on command. Moreover, the circuit permits routine testing of the crowbar switches without blowing the fuse, and routine testing of other components and modes of operation of the circuit. Other aspects and advantages of the invention will become apparent from the following more detailed description, taken in conjunction with the accompanying drawings.

DESCRIPTION OF THE PREFERRED EMBODIMENT

Figure 1:
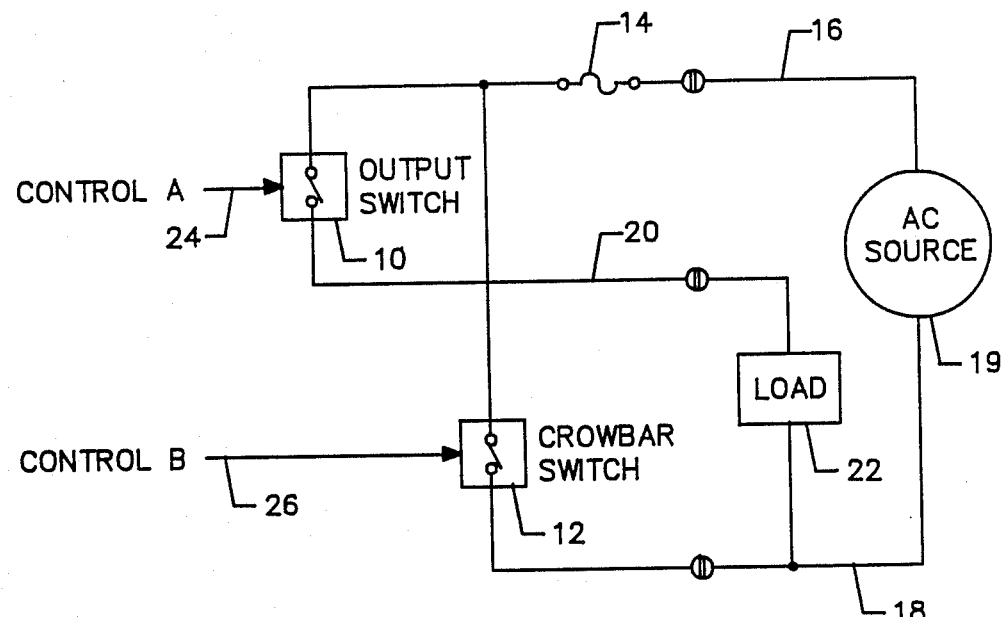
FIG. 1 is a simplified schematic diagram of a prior art fail-safe switching circuit for controlling an ac load using a crowbar switch.

As shown in the drawings for purposes of illustration, the present invention is concerned with providing fail-safe and fault tolerant operation in digital output circuits in industrial control systems and the like. Although such output circuits have been protected or guarded against possible component failure in prior control systems, these have had shortcomings that the present invention is designed to overcome.

Crowbar switches in general

FIG. 1 is a simplified schematic of a fail-safe output circuit using a single output switch, indicated by reference numeral 10, and a crowbar switch 12 operating in conjunction with a fuse 14. Alternating-current (ac) power is supplied over input power lines 16 and 18 from an ac power source 19. Line 16 is connected through the fuse 14 to the output switch 10, the other terminal of which is connected to an output line 20 that supplies power to a load 22. The load 22 is connected by its other terminal to the other input power line 18. Thus, when the fuse 14 is intact and the output switch 10 is ON the load 22 receives power from the lines 16, 18.

The crowbar switch 12 is connected between the input power line 16, on the switch side of the fuse 14, and the other input power line 18. The output switch 10 is controlled by a control signal A on line 24 and the crowbar switch 12 is controlled by a control signal B on line 26. Control signal B is generated only when control signal A is signaling an OFF condition to the output switch 10, but the output switch is sensed as still being in the closed condition. This is contrary to the primary design constraint for fail-safe output circuits, namely that the circuit not provide an erroneous ON condition when commanded to the OFF state. When control signal B, which is normally in the OFF state, signals an ON command to the crowbar switch 12, the switch closes and a short-circuit current flows in the lines 16, 18, thereby blowing the fuse 14 and switching off the load as desired.

In the past, such circuits have suffered from the difficulty that there was no effective method for testing the turn-on operation of the crowbar switch 12 without blowing the fuse 14. Another major point of vulnerability from a fail-safe standpoint was that the control signals A and B were derived from a common source. That is to say, a switch-on control signal B was generated only when control signal A was generating a switch-off signal, so it made sense to use the A switch-on control signal as an enabling signal for generating the control signal B. Thus if the circuitry that generated control signal A was at fault, causing the output switch 10 to remain closed, this same error would be propagated into the generation of control signal B, and the crowbar switch 12 would not close as desired.

It will be seen, therefore, that the circuit of FIG. 1 has two points of vulnerability from a fail-safe standpoint. First, the crowbar switch 12 is itself vulnerable because there is no effective way to test it on a regular basis without blowing the fuse on each test and involving an operator to replace the fuse. Second, an error in the generation of the control signal that is intended to open the output switch 10 could also affect the crowbar switch 12 and prevent fail-safe operation of the circuit.

Illustrative embodiment

Figure 2A:
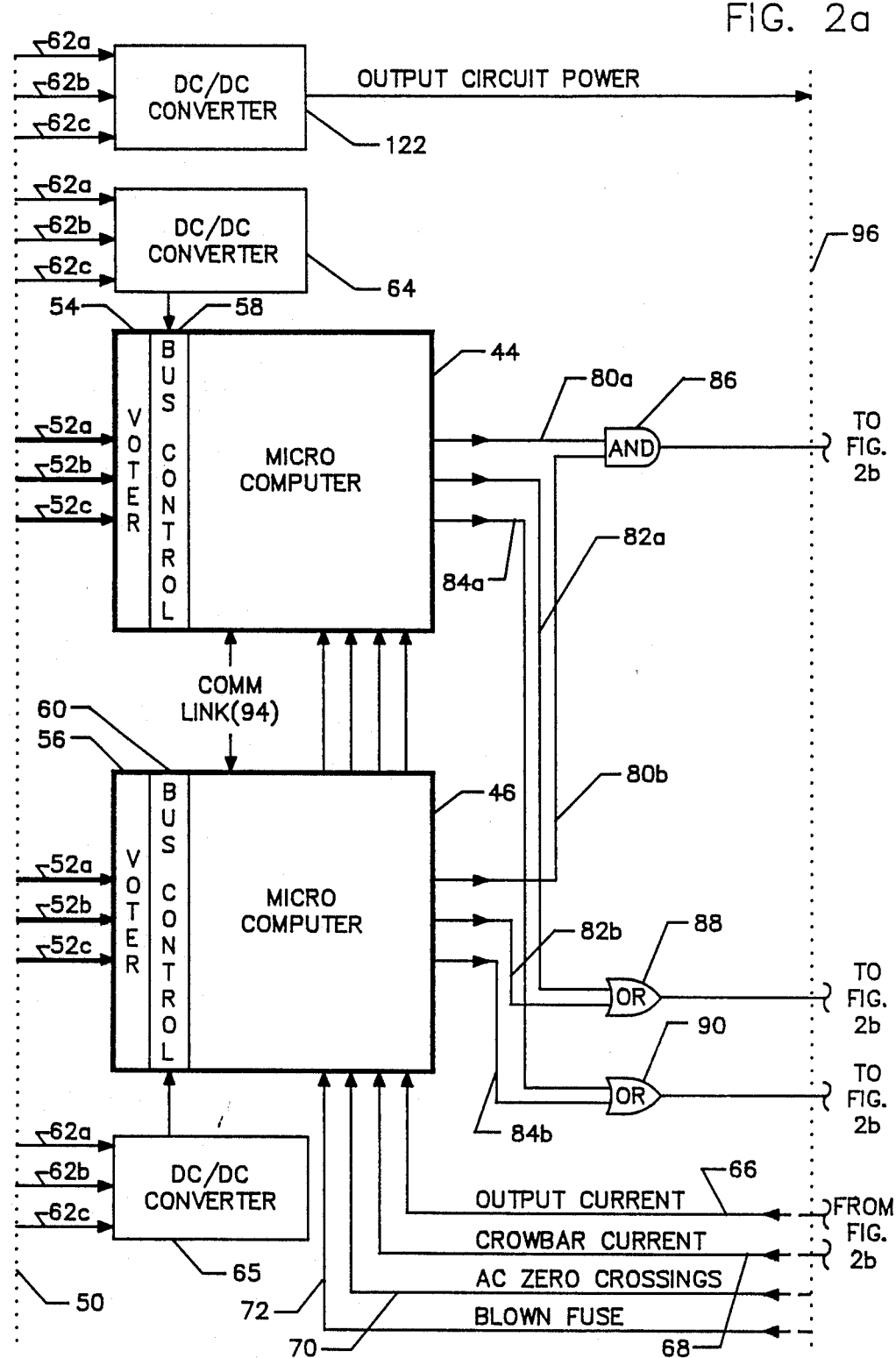
FIG. 2 is a simplified schematic diagram of a 110-volt ac guarded output circuit in accordance with the invention.
Figure 2B:
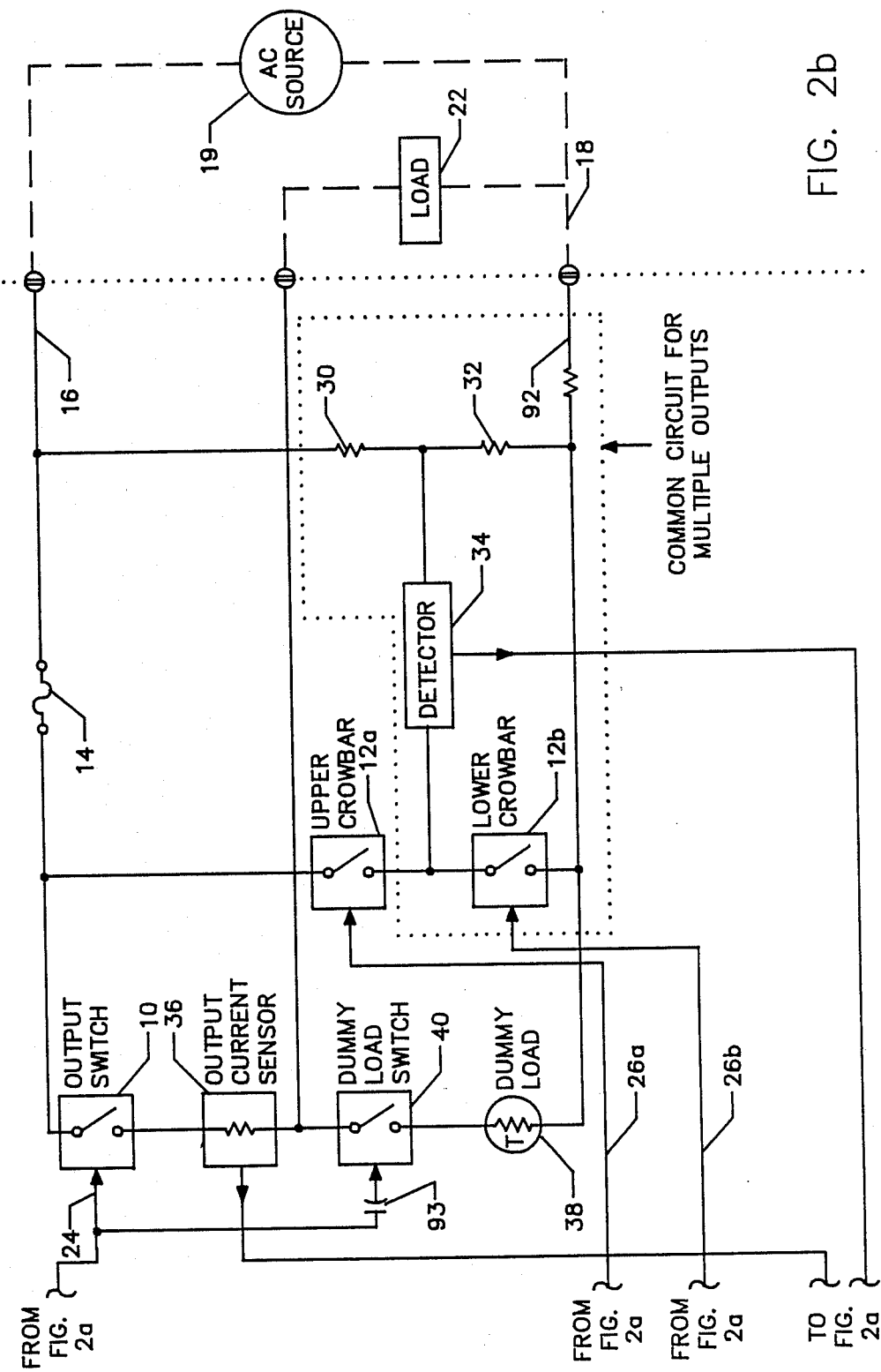

As shown in FIG. 2, the output circuit of the invention also has an output switch 10, input power lines 16, 18 from an ac power source 19, and an output line 20 leading to a load 22. The principal difference, however, is that instead of a single crowbar switch there are two, upper and lower, crowbar switches 12a, 12b connected in series between the input power line 16, on the switch side of the fuse 14, and the other input power line 18. As will be explained, this enables the crowbar switch turn-on function to be tested without blowing the fuse 14. For this purpose the circuit also includes two resistors 30, 32 connected in series between the ac lines 16, 18, and a detector circuit 34 connected between the junction of the two resistors and the junction between the two crowbar switches 12a, 12b.

The circuit of the invention also includes an output current sensor 36 in series with the output switch 10, and a dummy load circuit extending between the load line 20 and input power line 18. The dummy load circuit includes a dummy load 38 in the form of a thermistor, and a dummy load switch 40 in series with the dummy load.

All four switches in the circuit, including the output switch 10, the crowbar switches 12a, 12b and the dummy load switch 40, are solid-state switches. The output switch 10 is controlled by signals on line 24. The control terminal of the dummy load switch 40 is ac-coupled to the same control line 24. The upper and lower crowbar switches 12a, 12b are controlled by signals on lines 26a, 26b, respectively.

Operation of the output circuit as described thus far is controlled by two separate microcomputers 44 and 46. The digital output signals that are to be followed in switching the load 22 on or off, are generated in a control system that forms no part of the present invention. In the type of environment in which the invention would typically be employed, the control system would use multiple redundancy to ensure that the appropriate output signals had been computed with a high degree of fault tolerance. For this reason, the source of these signals is illustrated as being a triple-redundant bus 50 from which three independently generated output signals are supplied, on lines 52a, 52b and 52c. These three lines are coupled to two voter circuits 54 and 56 to ensure that an error in any one of the three signals will not affect the outcome. The voter circuits are interfaced with the microcomputers 44, 46 through respective bus control circuits 58, 60. Power from redundant sources is supplied to the microcomputers, bus control circuits and voters through three independently derived power supply lines 62a, 62b, 62c, and two dc to dc converters 64 and 65.

Each microcomputer 44, 46 receives signals from several sensors associated with the output circuit. These include a switch sensor line 66 from the output current sensor 36, a crowbar switch sensor line 68 from the detector circuit 34, an ac zero crossing sensor line 70, and a blown fuse sensor line 72. The switch sensor line 66 indicates to the microcomputers whether current is flowing through the output switch 10. The crowbar sensor switch line 68 is used in testing the operation of the crowbar switches 12a, 12b. For clarity, the connections of the sensor lines 70 and 72 are not shown but are conventional in form. The detection of zero voltage crossings in an ac line is a well known function. Also, the detection of a blown fuse condition is easily effected by sensing the voltage across the fuse, which will be practically zero if the fuse is intact.

The microcomputers 44 and 46 generate output signals based on the desired digital outputs supplied by the voters 54, 56, and on the sensed signals received over lines 66, 68, 70, 72. Microcomputer 44 generates output signals on three lines 80a, 82a and 84a. The other microcomputer 46 generates corresponding outputs on lines 80b, 82b and 84b. Signals on lines 80a and 80b are the output switch control signals. These are ANDed together in an AND gate 86, the output of which supplies control line 24 to the control terminal of the output switch 10. Signals on lines 82a and 82b are to control the upper crowbar switch 12a. These signals are ORed in an OR gate 88, the output of which supplies control line 26a to the control terminal of the upper crowbar switch 12a. Similarly, signals on lines 84a and 84b are to control the lower crowbar switch 12b, and are ORed together in another OR gate 90, the output of which supplies control line 26b to the control terminal of the lower crowbar switch.

The selection of an AND function for the output switch control signals requires that both microcomputers must agree on the output switch signal before the output switch 10 will be actually switched to the ON state. This provides a fail-safe drive signal to the output switch 10, and ensures that errors in the switching logic of one microcomputer will not cause the output switch to be erroneously switched to the ON condition, which would require that the fuse be blown by the crowbar switches. Use of the OR function for the crowbar switches 12a, 12b means that either of the microcomputers can generate signals to operate the crowbar switches.

In normal operation, the output current sensor 36 monitors the state of the output switch, since a current will be detected if the switch is closed and a load is connected to the circuit. If the sensor 36 detects a current through the output switch when the switch has been commanded to the OFF state, the microcomputers 44, 46 each generate output signals to close both crowbar switches 12a, 12b. A series resistor 92 in the input power line 18 limits the short-circuit current to a safe operating level.

The dummy load 38 is a positive temperature coefficient thermistor, which is switched ON upon a transition of the output switch 10 from OFF to ON. The signal pulse on line 24 needed to effect this transition is also coupled to the dummy load switch 40, through a capacitor 93, which switches the dummy load into the circuit. The dummy load remains connected until either the transitional energy coupled from line 24 is dissipated or the dummy load current crosses zero, and provides a path for current flow regardless of the external load connection. For each time that the output switch 10 is turned ON the microcomputers expect to see a current pulse caused by the temporary presence of the dummy load 38, indicating that the output switch 10 and current sensor 36 are functioning correctly.

The dummy load thermistor 38 also functions as a current limiter. Under normal operation the thermistor sees only an occasional current pulse and maintains a relatively low operating temperature and correspondingly low resistance. If the dummy load switch 40 were to fail in a closed condition, leaving the dummy load permanently connected, the temperature of the dummy load would rise, but its resistance would also rise, by several orders of magnitude, thereby limiting the dummy load current and the power dissipation to a relatively safe level.

As in other output circuits, electrical isolation is maintained between the circuit logic that generates switching control signals, and the load circuits being controlled. This is indicated diagrammatically in FIG. 2 by the dotted line 96. Circuitry on one side of this line is referred to as being "on the logic side," while circuitry on the other side of the line is referred to as being "on the load side." Isolation can be provided by conventional means, such as combinations of light-emitting diodes and photoconductive cells.

Diagnostic testing

An important aspect of the design of fault-tolerant output circuits is fault detection. It is vital that provision be made to test all components of the circuit periodically, and to report any failure before a subsequent failure can render the whole circuit unsafe. The following is a list of tests performed routinely by the microcomputers 44, 46. Errors are reported on a four-digit display (not shown) of conventional design.

Logic circuit verification: The two microcomputers 44, 46 communicate over a serial communications link 94 to compare data received from the triple-redundant bus 50, and to compare data with respect to their internal memories and interrupt and timer circuits.

Ac line status: Zero crossings from the ac lines, received on line 70, are checked for proper stability and frequency.

Drive circuit verification: The AND gate 86 is checked to verify that each microcomputer can independently turn off the control signal 24 to the output switch 10. This test utilizes feedback from the logic side of the isolation line 96, to avoid interruption of operation of the output switch 10.

Switch ON verification: When the output switch 10 is commanded ON, the current sensor 36 provides a symmetrical square-wave signal if the switch is conducting properly in both directions. The current waveform is checked for proper frequency and symmetry.

Figure 3:
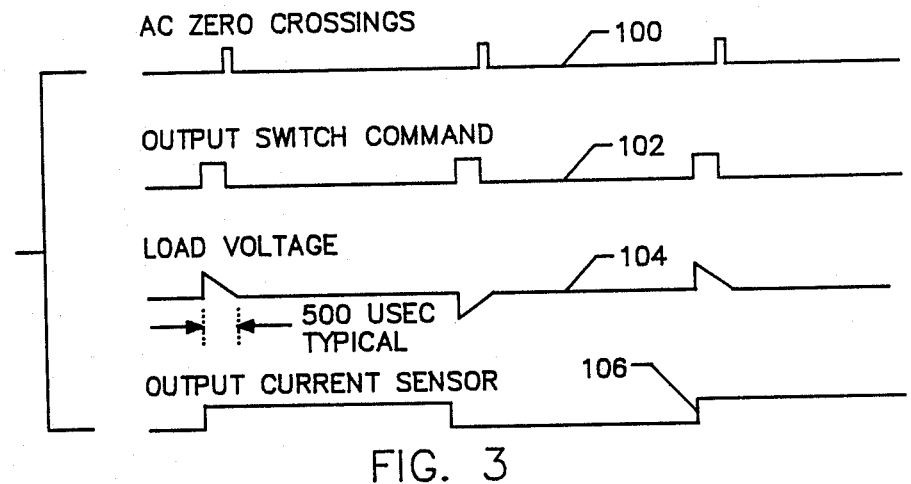
FIG. 3 is a timing diagram illustrating the sequence of events in a turn-ON test of the circuit of FIG. 2.

Switch turn-on test: When the output switch 10 is in the OFF condition, it is turned ON briefly just prior to (or just after) each ac zero crossing so as not to disturb the load. The dummy load 38 is switched on when the output switch transitions from the OFF to the ON condition, and provides a current path regardless of the condition of the load. The current sensor 36 provides an output that changes state on each successive half cycle that the test pulse is active, but only if the output switch can conduct in both directions. In FIG. 3, the waveform 100 indicates the timing of the zero crossings, and waveform 102 shows the timing of the output switch commands for the turn-on test. Waveform 104 shows the variations in load voltage that ensue from the switch ON commands, and waveform 106 is the square-wave derived from the output current sensor 36 during this test.

Figure 4A:
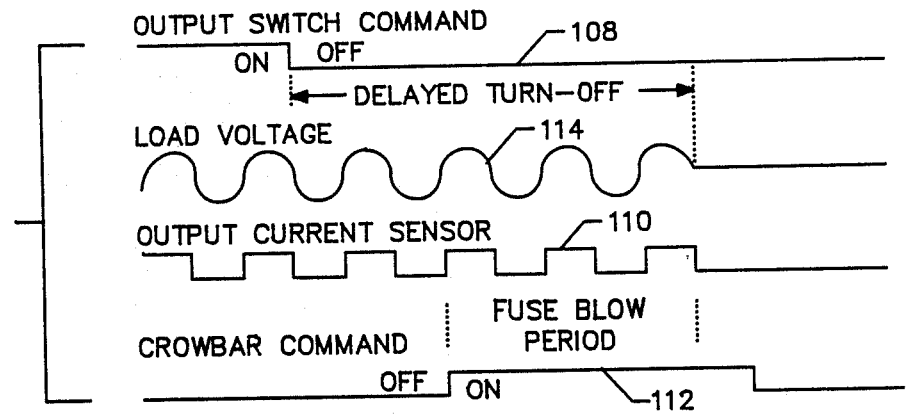
FIG. 4a is a timing diagram of the sequence of events that occurs during the blowing of a fuse when the circuit of FIG. 2 fails to respond to an OFF command.

Switch turn-off operation: This is the failsafe operation of the circuit. Each time that the output switch is commanded OFF, as indicated in FIG. 4a at 108, and current is still sensed at the sensor 36, as indicated at 110, a signal is generated to close the crowbar switches 12a, 12b, as indicated at 112. The same action is taken if load current is sensed during the entire time that the output switch is commanded OFF, as illustrated by the timing diagram of FIG. 4b, in which the condition of the output switch command is indicated at 108', the sensed output current at 110', and the crowbar command signal at 112'.

Figure 4B:
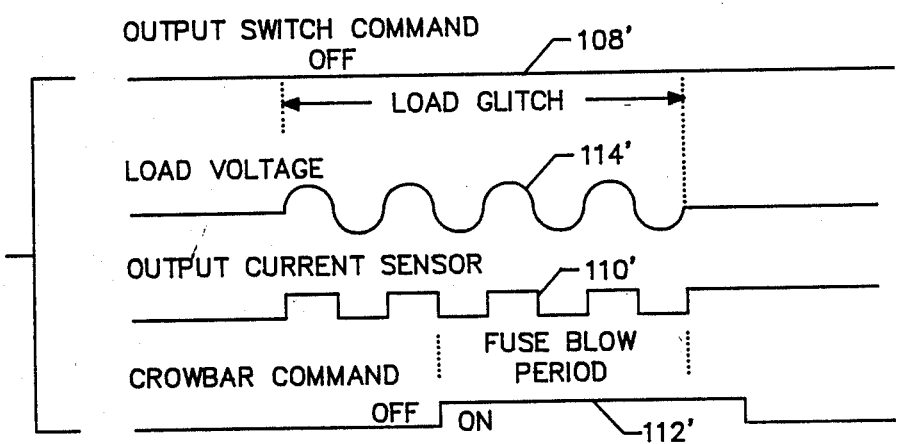
FIG. 4b is a timing diagram of the sequence of events that occurs during the blowing of a fuse when the circuit of FIG. 2 detects output current in the OFF state of the output switch.

It is important to note that the voltage seen by the load, as indicated at 114 in FIG. 4a and 114' in FIG. 4b, is incorrect for approximately four ac cycles, the time it takes to detect the incorrect state and blow the fuse. The majority of industrial control applications can tolerate incorrect states for a short period of time. In fact, many ac loads have actuation times on the order of one second.

Crowbar test: This is the test employed to check both crowbar switches 12a, 12b without blowing the fuse 14. Each switch 12a or 12b is closed separately, and the current flow is checked using the detector 34. If the crowbar can conduct in both directions, then the detector output will be a pulse train with a frequency that is twice the line frequency.

Open Load test: If the output switch 10 is commanded to the ON condition but no current is detected in the switch, a switch turn-on test is performed using a dummy load to determine if the output switch and output current sensor are working. If the test is successful, it is assumed that the load is open-circuited.

Blown fuse test: When a blown fuse is detected, from a measurement of the voltage across the fuse 14, an appropriate error condition is indicated. If the crowbar switches 12a, 12b had been fired to blow the fuse, the condition will be reported as an output circuit failure, which is the condition that caused the fuse to be blown.

Fault-tolerant operation

Figure 5:
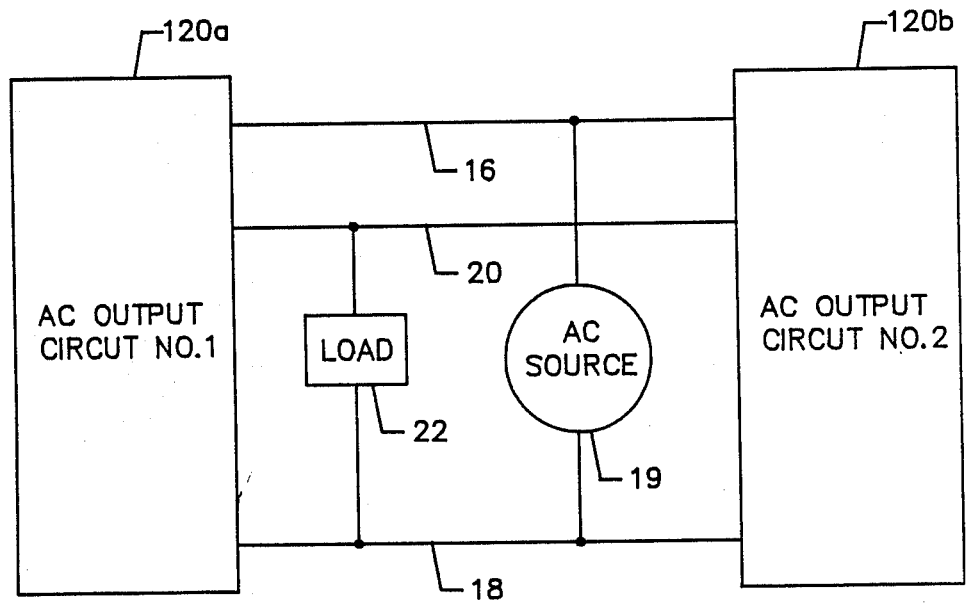
FIG. 5 is a simplified schematic diagram showing two circuits embodying the present invention, connected to a single load to provide fault-tolerant operation.

For fault-tolerant operation, two output modules of the type described, as indicated at 120a and 120b in FIG. 5, are connected to common ac lines 16, 18 and to a single load 22 through a common load line 20. Each module operates independently of the other to control the output state, to perform routine tests, and to blow its fuse with the crowbar switches if necessary. The output switches 10 of the two modules 120a, 120b are effectively connected in parallel between the ac input line 16 and the load 22. If one module fails to switch its output switch OFF in response to a command, operation of the crowbar switches in that module will blow the fuse and effectively remove the module from further operation. The remaining module, if still operating correctly, will continue to control the switching of the load. Indicators on the defective module will alert the operator and permit replacement of the module before a subsequent error is likely to occur on the remaining module.

This independent operation of the modules is made possible by two features of the output circuit. First, the use of current sensing to detect correct operation of the output switch, provides for independent error detection. If voltage sensing were used, the failure of one switch would be sensed as a failure in both modules, since the output switches are connected in parallel. Second, the drive voltage for each output switch is derived from an isolated power supply, as indicated at 122 in FIG. 2. Typically, the drive voltage for an output switch is derived from the voltage present at the switch terminal when the switch is open. When two output switches configured in this manner are connected in parallel, only one will turn on, and this will deny drive voltage to the one that remains off. In the configuration of the invention, the drive voltage for each output switch is derived from an independent and isolated power source and the two switches can be closed, although connected in parallel. Current will flow through each output switch to the load, and the division of current through each switch will be determined by how well their characteristics are matched.

Modularity

The output circuit modules described may be conveniently fabricated to provide a number of independent output switches in a single circuit module. For example, the circuits have been configured to include sixteen on a single rack-mountable module. Moreover, although the output circuits operate completely independently in an electrical sense, a portion of the circuitry relating to testing of the crowbar switches can be shared by multiple output circuits. Specifically, the circuit elements outlined by the envelope 130 in FIG. 2 is shared, including the lower crowbar switch 12b, the detector 34 and the resistors 30, 32 and 42.

Exemplary microcomputer program

The microcomputers 44, 46 are programmed to process digital output signals each receives from a controller, and to output these to the respective output switches. In addition, each microcomputer cycles through the various diagnostic tests on the output circuit. The details of software implementation are straightforward and a matter of design choice. However, to ensure completeness of the disclosure, a printout of the microcomputer software is included as an appendix to this specification. The program is written in assembly language for the INTEL 8031 microprocessor chip, manufactured by INTEL Corporation, Santa Clara, Calif. 95051.

Summary of features

The most important features of the invention are the use of two crowbar switches, to permit automatic testing of crowbar switch operation without blowing the fuse, the use of an output current sensor to verify switching ON, and the use of the current sensor in conjunction with a dummy load to conduct a turn-on test when the output switch is OFF. These and other diagnostic features provide fail-safe and fault-tolerant operation without any sacrifice in performance or testability of the circuit.

The detailed manner in which these features have been implemented is largely a matter of design choice. Microcomputer control was selected for its ease of testing and modification, but hard-wired logic could have been equally well employed. For the most part, the present invention is embodied in components located on the load side of the isolation line 96 of FIG. 2. The manner in which the control signals on lines 24, 26a and 26b are derived is not critical to the invention in its broadest sense. In accordance with one aspect of the invention, the AND gate 86 and the OR gates 88 and 90 are used to combine two independently generated sets of control signals, but the details of operation of the microcomputers are not believed to be significant. Likewise, although the microcomputers are shown as receiving digital output signals from voter circuits 54, 56, this aspect is not critical to the invention either. The digital outputs could be received on a single line, although the likelihood is that a failsafe and fault-tolerant output circuit would only be used in conjunction with a multiple-redundant controller of some kind.

It will be appreciated that the present invention represents a significant advance in the field of industrial-type controllers, and digital output circuits in particular. Specifically, the invention provides an ac digital output circuit that is fail-safe and may be connected in a fault-tolerant manner, largely because of the use of two crowbar switches instead of one, and a current sensor and dummy load for enhanced diagnostic testing ability. It will also be appreciated that, although a number of embodiments of the invention have been described in detail for purposes of illustration, various modifications may be made without departing from the spirit and scope of the invention. Accordingly, the invention is not to be limited except as by the appended claims.

I claim:

1. A fail-safe output circuit for controlling an alternating-current (ac) load supplied from two lines from an ac power source, the circuit comprising:
   two ac power lines;
   a fuse connected in one of the ac power lines;
   an output switch connected in series with the fuse;
   two crowbar switches connected in series across the ac power lines;
   means for closing the crowbar switches together and blowing the fuse to disconnect the load in the event that the output switch fails to open on command; and,
   wherein said means for closing includes means for closing the crowbar switches independently to test their operation without blowing the fuse.

2. A fail-safe output circuit as defined in claim 1, and further comprising:
   a pair of current-limiting resistors connected in series between the two ac power lines; and
   current detection means connected to a junction point between the two crowbar switches and to a junction point between the two resistors, whereby closure of either of the crowbar switches causes the flow of current through the current detection means and one of the resistors, but the current is not great enough to blow the fuse.

3. A fail-safe output circuit as defined in claim 2, wherein:
   the output switch and the crowbar switches include solid-state switches.

4. A fail-safe output circuit as defined in claim 1, and further comprising:
   an output current sensor coupled in series with the output switch, to detect current flow through the output switch.

5. A fail-safe output circuit as defined in claim 4, wherein
   the output switch and the crowbar switches include solid-state switches.

6. A fail-safe output circuit as defined in claim 4, and further comprising:
   a dummy load and a dummy load switch connected together in series and connected in parallel with the load, to create a detectable current flow when the output switch is switched on momentarily, regardless of the condition of the load.

7. A fail-safe output circuit as defined in claim 6, wherein:
   the dummy load switch is responsive only to a transition from OFF to ON state of the output switch.

8. A fail-safe output circuit as defined in claim 7, wherein:

the dummy load includes a positive temperature coefficient thermistor, which operates to limit current in the dummy load in the event that the dummy load switch fails in the ON state.

9. A fail-safe output circuit as defined in claim 6, wherein:
the output switch, the crowbar switches and the dummy load switch include solid-state switches.

10. A fail-safe output circuit as defined in claim 1, and further wherein said means for closing the crowbar switches together includes:
means for independently generating multiple control signals for operating the output switch; and
means for ANDing the multiple control signals to minimize the number of erroneous switch-on signals applied to the output switch.

11. A fail-safe output circuit as defined in claim 1, wherein:
the means for closing the crowbar switches together includes means for independently generating multiple control signals for operating each crowbar switch; and
means for logically ORing the multiple control signals for each crowbar switch, to close the crowbar switches even if only one of the multiple control signals commands the closure.

12. A fail-safe output circuit as defined in claim 1, wherein:
the output switch and the crowbar switches include solid-state switches.

13. A fail-safe output circuit as defined in claim 1, and further comprising a second output circuit to provide fault-tolerant operation, the second output circuit having:
a second fuse connected by one end to the same ac power line as the first fuse;
a second output switch connected in series with the second fuse;
two additional crowbar switches connected in series across the ac power lines;
means for closing the additional crowbar switches together and blowing the second fuse to disconnect the load in the event that the second output switch fails to open on command; and
wherein said means for closing the crowbar switches together includes means for closing the additional crowbar switches independently to test their operation without blowing the second fuse;
whereby the second output switch is connected in parallel with the first output switch and operates independently to provide additional security in switching the load on, and the additional crowbar switches operate independently of the the first ones, to blow the second fuse in the event of an independently detected error in the ability of the second output switch to open on command.

14. A fail-safe output circuit for controlling an alternating-current (ac) load supplied from two ac power lines, the circuit comprising:
two ac power lines;
a fuse connected in one of the ac power lines;
an output switch connected in series with the fuse and having a control terminal;
two crowbar switches, each having a control terminal, the two being connected in series from a point at the junction between the output switch and the fuse to a point on the other ac power line;
first control means for generating output switch control signals applied to the control terminal of the output switch, to open and close the output switch as desired, and for generating control signals applied to the control terminals of the crowbar switches, for independently controlling closure of the crowbar switches;
second control means for generating a second set of control signals for application to the output switch and the crowbar switches;
means for logically combining the two sets of control signals for application to the control terminals of the output switch and the crowbar switches;
means for detecting current flow in either one of the crowbar switches if separately closed, whereby closure of the crowbar switches can be tested by closing each switch separately and detecting current through the closed switch;
means for sensing current flow through the output switch regardless of load condition, to permit testing of output switch closure.

15. A fail-safe output circuit as defined in claim 14, wherein the means for detecting current flow through a closed crowbar switch includes:
two resistors connected in series between the ac power lines; and
current detection means connected between the junction between the two crowbar switches and the junction between the two resistors.

16. A fail-safe output circuit as defined in claim 14, wherein the means for sensing current flow in the output switch includes:
a current sensor, in series with the switch;
a dummy load connected in parallel with the load; and
a dummy load switch connected in series with the dummy load, and having a control terminal responsive to control signals applied to the control terminal of the output switch to switch it from OFF to ON, whereby the dummy load is switched on momentarily each time the output switch is switched to ON, and turn-on operation of the output switch can be tested by momentary turn-on pulses applied to the control terminal of the output switch, which generate momentary current pulses through the dummy load and the current sensor, regardless of the condition of the real load.

17. A fail-safe output circuit as defined in claim 16, wherein the means for sensing current flow through the output switch includes:
turn-on test means, operative when the output switch is commanded ON continuously and no output current is detected, for initiating a test of the turn-on operation of the output switch without disturbing the load condition, whereby positive testing of the turn-on operation when no output current is sensed indicates that an open-load condition exists.

* * * * *